(12) United States Patent
Goodchild et al.

(10) Patent No.: US 12,142,942 B2
(45) Date of Patent: *Nov. 12, 2024

(54) STACKED PRINTED CIRCUIT BOARD SURFACE IN A FREE-POSITION WIRELESS CHARGER

(71) Applicant: AIRA, INC., Phoenix, AZ (US)

(72) Inventors: Eric Heindel Goodchild, Phoenix, AZ (US); Camron Vossberg, Tempe, AZ (US); Kevin Slatnick, San Diego, CA (US)

(73) Assignee: Aira, Inc., Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/233,876

(22) Filed: Aug. 14, 2023

(65) Prior Publication Data

US 2024/0055907 A1 Feb. 15, 2024

Related U.S. Application Data (63) Continuation of application No. 16/952,701, filed on Nov. 19, 2020, now Pat. No. 11,728,689.

(51) Int. Cl.
*H02J 7/00* (2006.01)
*H02J 50/10* (2016.01)
(Continued)

(52) U.S. Cl.
CPC ............ *H02J 50/402* (2020.01); *H02J 50/10* (2016.02); *H02J 50/60* (2016.02); *H02J 50/70* (2016.02)

(58) Field of Classification Search
USPC .......................... 320/106, 109, 110, 108, 107
See application file for complete search history.

(56) References Cited

U.S. PATENT DOCUMENTS 6,005,310 A * 12/1999 Mosciatti ............... H02K 11/21
  310/12.02
7,952,322 B2  5/2011 Partovi et al.
(Continued)

FOREIGN PATENT DOCUMENTS

KR   20160087039 A   7/2016
KR   20170076170 A   7/2017
(Continued)

OTHER PUBLICATIONS

Corresponding KR Application No. 10-2023-7020574. Office Action (Feb. 17, 2024).
(Continued)

*Primary Examiner* — Brian Ngo
(74) *Attorney, Agent, or Firm* — Anthony Smyth; LOZA & LOZA, LLP (57) ABSTRACT

A charging device has a first printed circuit board (PCB) having a top metal layer and a bottom metal layer, where a first plurality of charging cells is provided on the top metal layer of the first PCB and a second plurality of charging cells is provided on the bottom metal layer of the first PCB. The charging device may have a second PCB having a top metal layer and a bottom metal layer, where a third plurality of charging cells is provided on the top metal layer of the second PCB and a fourth plurality of charging cells is provided on the bottom metal layer of the second PCB. An adhesive layer may join the first and second PCBs. One or more interconnects may be provided between the bottom metal layer of the first PCB and the top metal layer of the second PCB.

16 Claims, 8 Drawing Sheets

(51) Int. Cl.
   *H02J 50/40* (2016.01)
   *H02J 50/60* (2016.01)
   *H02J 50/70* (2016.01)

(56) References Cited

U.S. PATENT DOCUMENTS

| | | | |
|---|---|---|---|
| 2007/0182367 A1* | 8/2007 | Partovi | H02J 50/12 |
| | | | 320/108 |
| 2010/0181842 A1 | 7/2010 | Suzuki et al. | |
| 2012/0049991 A1* | 3/2012 | Baarman | H02J 50/005 |
| | | | 336/199 |
| 2013/0069444 A1 | 3/2013 | Waffenschmidt et al. | |
| 2013/0169222 A1 | 7/2013 | Yoon et al. | |
| 2017/0310147 A1 | 10/2017 | Wu et al. | |
| 2019/0081517 A1* | 3/2019 | Graham | G01K 7/22 |
| 2019/0267828 A1 | 8/2019 | Goodchild et al. | |

FOREIGN PATENT DOCUMENTS

| | | |
|---|---|---|
| KR | 20180073667 A | 7/2018 |
| KR | 20190115573 A | 10/2019 |

OTHER PUBLICATIONS

PCT/US2020/061645. International Search Report & Written Opinion (Feb. 26, 2021). 10 pages.
Anonymous: 'Castellated Holes'. Prototype PCB. Jun. 12, 2019. [retrieved 14 Jan. 8, 2021 via the internet at: <https://web.archive.org/web/20190612224243/http://prototypepcb.com:80/castellated-holes>. 5 pages.

* cited by examiner

STACKED PRINTED CIRCUIT BOARD SURFACE IN A FREE-POSITION WIRELESS CHARGER

PRIORITY CLAIM

This application is a continuation of patent application Ser. No. 16/952,701 filed in the United States Patent Office on Nov. 19, 2020 and the entire content of this application is incorporated herein by reference as if fully set forth below in their entirety and for all applicable purposes.

TECHNICAL FIELD

The present invention relates generally to the structure and manufacture of wireless charging devices, and more particularly to the use of layered printed circuit boards to provide a charging surface of a wireless charging device.

BACKGROUND

Wireless charging systems have been deployed to enable certain types of devices to charge internal batteries without the use of a physical charging connection. Devices that can take advantage of wireless charging include mobile processing and/or communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Improvements in wireless charging capabilities are required to support continually increasing complexity of mobile devices and changing form factors. In one example, a wireless charging device may need to provide a transmitting coil with a current that can strain or exceed the capabilities of conventional multi-layer printed circuit boards. In one example, the use of multiple transmitting coils to provide a large area charging surface in a wireless charging device strains or exceeds the capabilities of conventional multi-layer printed circuit boards and creates a need for improved techniques for constructing and manufacturing.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods applicable to wireless charging devices and techniques. In a wireless charging device, charging cells may be configured with one or more inductive coils to provide a charging surface that can charge one or more devices wirelessly. The location of a device to be charged may be detected through sensing techniques that associate location of the device to changes in a physical characteristic centered at a known location on the charging surface. Sensing of location may be implemented using capacitive, resistive, inductive, touch, pressure, load, strain, and/or another appropriate type of sensing.

In one aspect of the disclosure, an apparatus has a battery charging power source, a plurality of charging cells configured in a matrix, a first plurality of switches in which each switch is configured to couple a row of coils in the matrix to a first terminal of the battery charging power source, and a second plurality of switches in which each switch is configured to couple a column of coils in the matrix to a second terminal of the battery charging power source. Each charging cell in the plurality of charging cells may include one or more coils surrounding a power transfer area. The plurality of charging cells may be arranged adjacent to a charging surface without overlap of power transfer areas of the charging cells in the plurality of charging cells.

Certain aspects of the present disclosure relate to systems and apparatus for wireless charging that use stacked coils that can charge target devices presented to a charging device without a requirement to match a particular geometry or location within a charging surface of the charging device. Each coil may have a shape that is substantially polygonal. In one example, each coil may have a hexagonal shape. Each coil may be implemented using wires, printed circuit board (PCB) traces and/or other connectors that are provided in a spiral. Each coil may span two or more layers separated by an insulator or substrate such that coils in different layers are centered around a common axis.

According to certain aspects disclosed herein, power can be wirelessly transferred to a receiving device located anywhere on a charging surface, which can have an arbitrarily defined size and/or shape without regard to any discrete placement locations enabled for charging. Multiple devices can be simultaneously charged on a single charging surface. In one aspect of the disclosure, a charging surface may be manufactured using PCB technology in a manner that enables a driver circuit to provide a high-amperage current to transmitting coils in the charging surface. In one aspect of the disclosure, the charging surface may be manufactured using a stack of low-cost two-layer PCBs. In one aspect of the disclosure, a multilayer circuit board may be configured with more than two metal layers, and may include one or more additional layers that perform functions associated with wireless charging. The additional layers may include one or more electromagnetic shielding layers. The additional layers may include one or more thermal layers configured to assist dissipation of heat from the charging surface. The additional layers may include one or more thermal layers configured to insulate zones of the charging surface from heat generated or introduced in other portions of the charging surface. The additional layers may include one or more sensors that can detect presence of an object placed on the charging surface, thermal condition of the charging circuit, strain in the charging surface and other properties or events. According to various aspects, a charging surface constructed from a stack of low-cost, two-layer PCBs can incorporate various functional layers in a compact design that supports concurrent high-power wireless charging by multiple transmitting coils. In some examples, the concepts described in relation to a two-layer PCB and be applied to a stack of stack of four-layer PCBs, or PCBs with a greater number of layers that are suitable for providing transmitting coils and distributing high-amperage current to the transmitting coils.

Charging Cells

According to certain aspects disclosed herein, a charging device may provide a charging surface using charging cells that are deployed adjacent to the charging surface. In one example, the charging cells are deployed in one or more layers of the charging surface in accordance with a honeycomb packaging configuration. A charging cell may be implemented using one or more coils that can each induce a magnetic field along an axis that is substantially orthogonal to the charging surface adjacent to the coil. In this description, a charging cell may refer to an element having one or more coils where each coil is configured to produce an electromagnetic field that is additive with respect to the fields produced by other coils in the charging cell, the electromagnetic field producing a magnetic flux directed along or proximate to a common axis.

In some implementations, a charging cell includes coils that are stacked along a common axis and/or that overlap such that they contribute to an induced magnetic field substantially orthogonal to the charging surface. In some implementations, a charging cell includes coils that are arranged within a defined portion of the charging surface and that contribute to an induced magnetic field within the substantially orthogonal portion of the charging surface associated with the charging cell. In some implementations, charging cells may be configurable by providing an activating current to coils that are included in a dynamically defined charging cell. For example, in a charging device may include multiple stacks of coils deployed across the charging surface, the charging device may detect the location of a device to be charged and may select some combination of stacks of coils to provide a charging cell adjacent to the device to be charged. In some instances, a charging cell may include, or be characterized as a single coil. However, it should be appreciated that a charging cell may include multiple stacked coils and/or multiple adjacent coils or stacks of coils. The coils may be referred to herein as charging coils, wireless charging coils, transmitter coils, transmitting coils, power transmitting coils, power transmitter coils, or the like.

Figure 1:
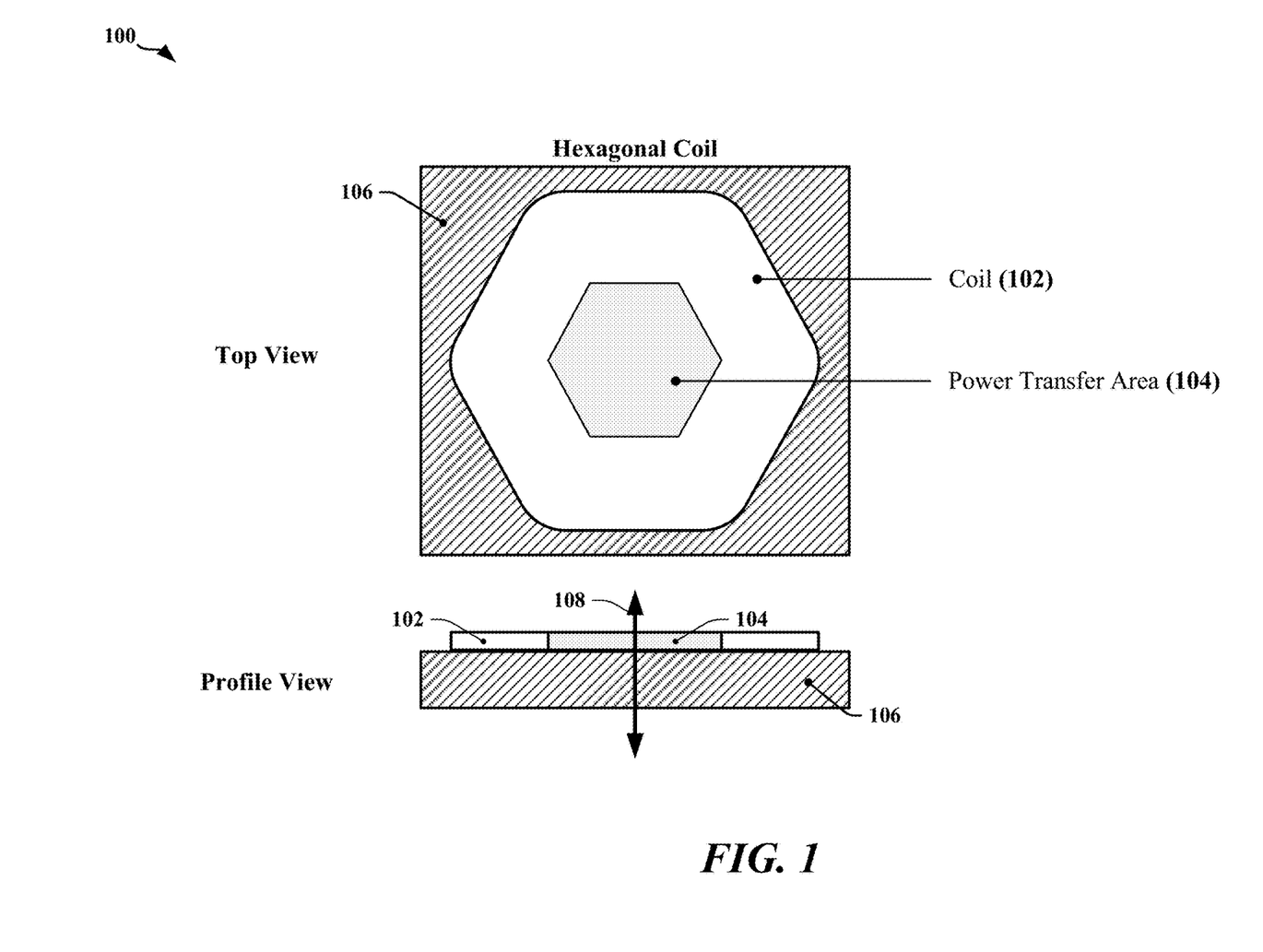
FIG. 1 illustrates an example of a charging cell that may be provided on a charging surface in accordance with certain aspects disclosed herein.

FIG. 1 illustrates an example of a charging cell 100 that may be deployed and/or configured to provide a charging surface of a charging device. As described herein, the charging surface may include an array of charging cells 100 provided on one or more substrates 106. A circuit comprising one or more integrated circuits (ICs) and/or discrete electronic components may be provided on one or more of the substrates 106. The circuit may include drivers and switches used to control currents provided to coils used to transmit power to a receiving device. The circuit may be configured as a processing circuit that includes one or more processors and/or one or more controllers that can be configured to perform certain functions disclosed herein. In some instances, some or all of the processing circuit may be provided external to the charging device. In some instances, a power supply or battery may be coupled to the charging device.

The charging cell 100 may be provided in close proximity to an outer surface area of the charging device, upon which one or more devices can be placed for charging. The charging device may include multiple instances of the charging cell 100. In one example, the charging cell 100 has a substantially hexagonal shape that encloses one or more coils 102 constructed using conductors, wires or circuit board traces that can receive a current sufficient to produce an electromagnetic field in a power transfer area 104. In various implementations, some coils 102 may have a shape that is substantially polygonal, including the hexagonal charging cell 100 illustrated in FIG. 1. Other implementations provide coils 102 that have other shapes. The shape of the coils 102 may be determined at least in part by the capabilities or limitations of fabrication technology, and/or to optimize layout of the charging cells on a substrate 106 such as a PCB substrate. Each coil 102 may be implemented using wires, PCB traces and/or other connectors in a spiral configuration. Each charging cell 100 may span two or more layers separated by an insulator or substrate 106 such that coils 102 in different layers are centered around a common axis 108.

Figure 2:
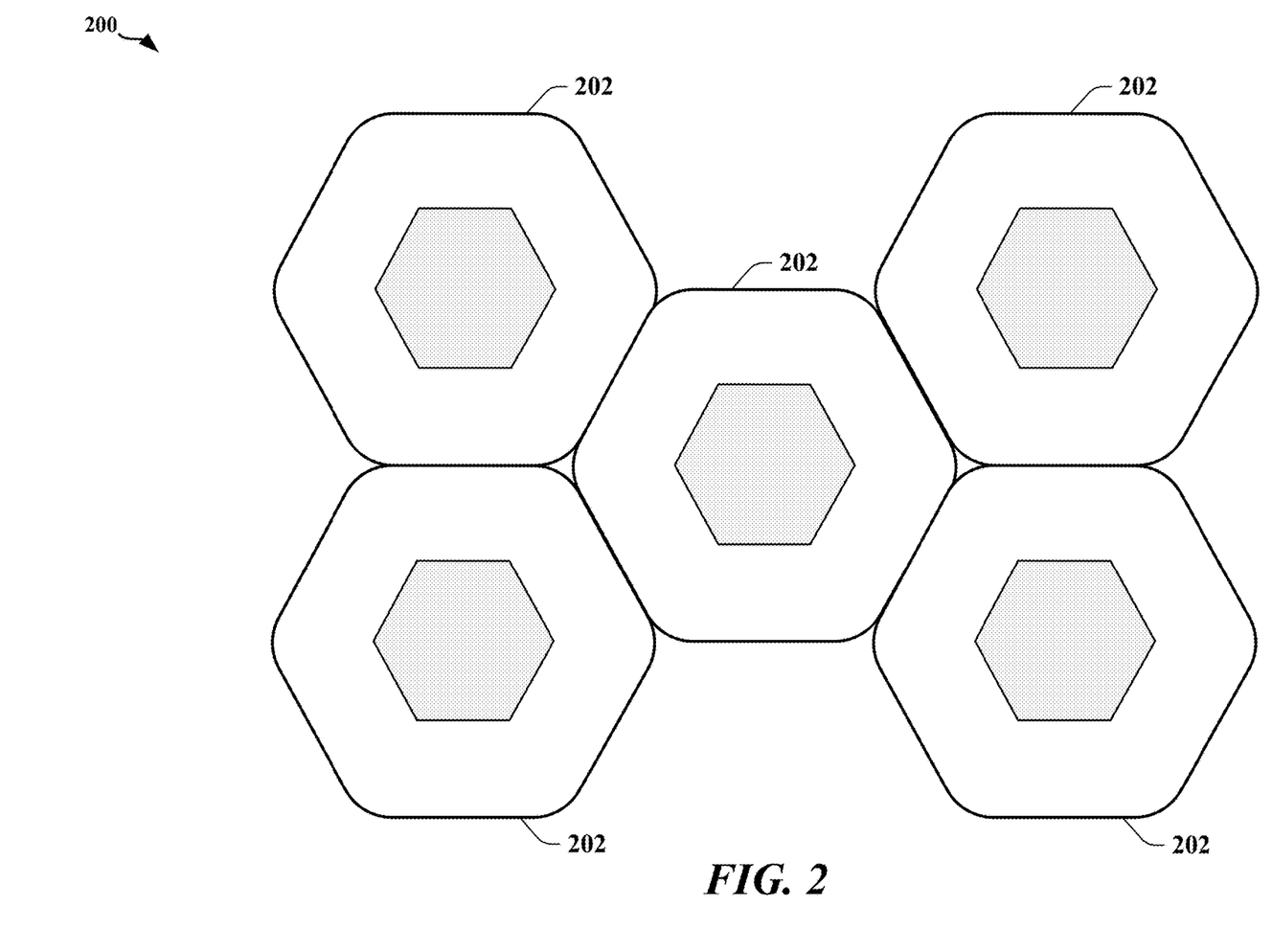
FIG. 2 illustrates an example of an arrangement of charging cells provided on a single layer of a segment of a charging surface in accordance with certain aspects disclosed herein.

FIG. 2 illustrates an example of an arrangement 200 of charging cells 202 provided on a single layer of a segment of a charging surface of a charging device that may be adapted in accordance with certain aspects disclosed herein. The charging cells 202 are arranged according to a honeycomb packaging configuration. In this example, the charging cells 202 are arranged end-to-end without overlap. This arrangement can be provided without through-hole or wire interconnects. Other arrangements are possible, including arrangements in which some portion of the charging cells 202 overlap. For example, wires of two or more coils may be interleaved to some extent.

Figure 3:
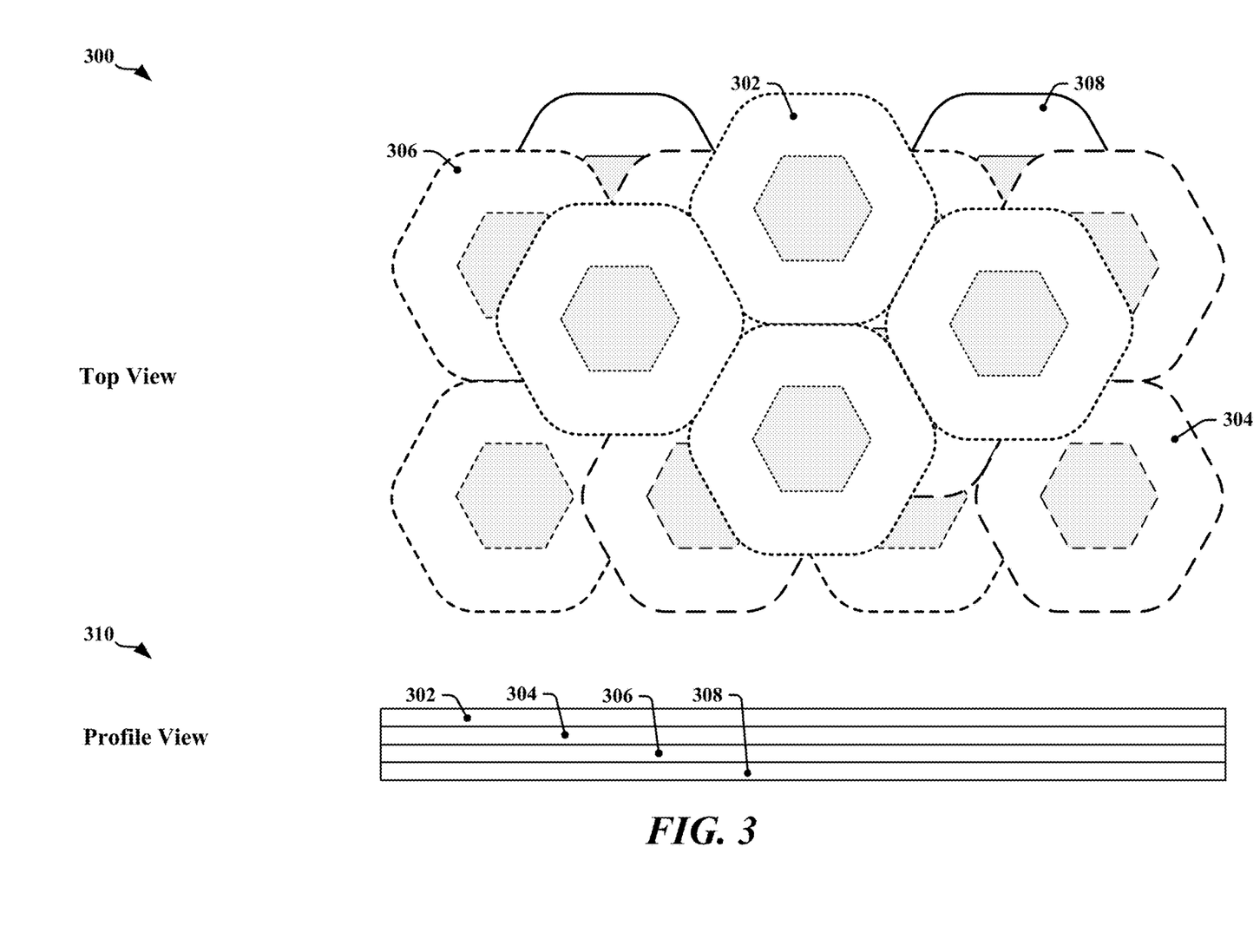
FIG. 3 illustrates an example of an arrangement of charging cells when multiple layers are overlaid within a segment of a charging surface in accordance with certain aspects disclosed herein.

FIG. 3 illustrates an example of an arrangement of charging cells from two perspectives 300, 310 when multiple layers are overlaid within a segment of a charging surface that may be adapted in accordance with certain aspects disclosed herein. Layers of charging cells 302, 304, 306, 308 are provided within a segment of a charging surface. The charging cells within each layer of charging cells 302, 304, 306, 308 are arranged according to a honeycomb packaging configuration. In one example, the layers of charging cells 302, 304, 306, 308 may be formed on a PCB that has four or more layers. The arrangement of charging cells 100 can be selected to provide complete coverage of a designated charging area that is adjacent to the illustrated segment.

Figure 4:
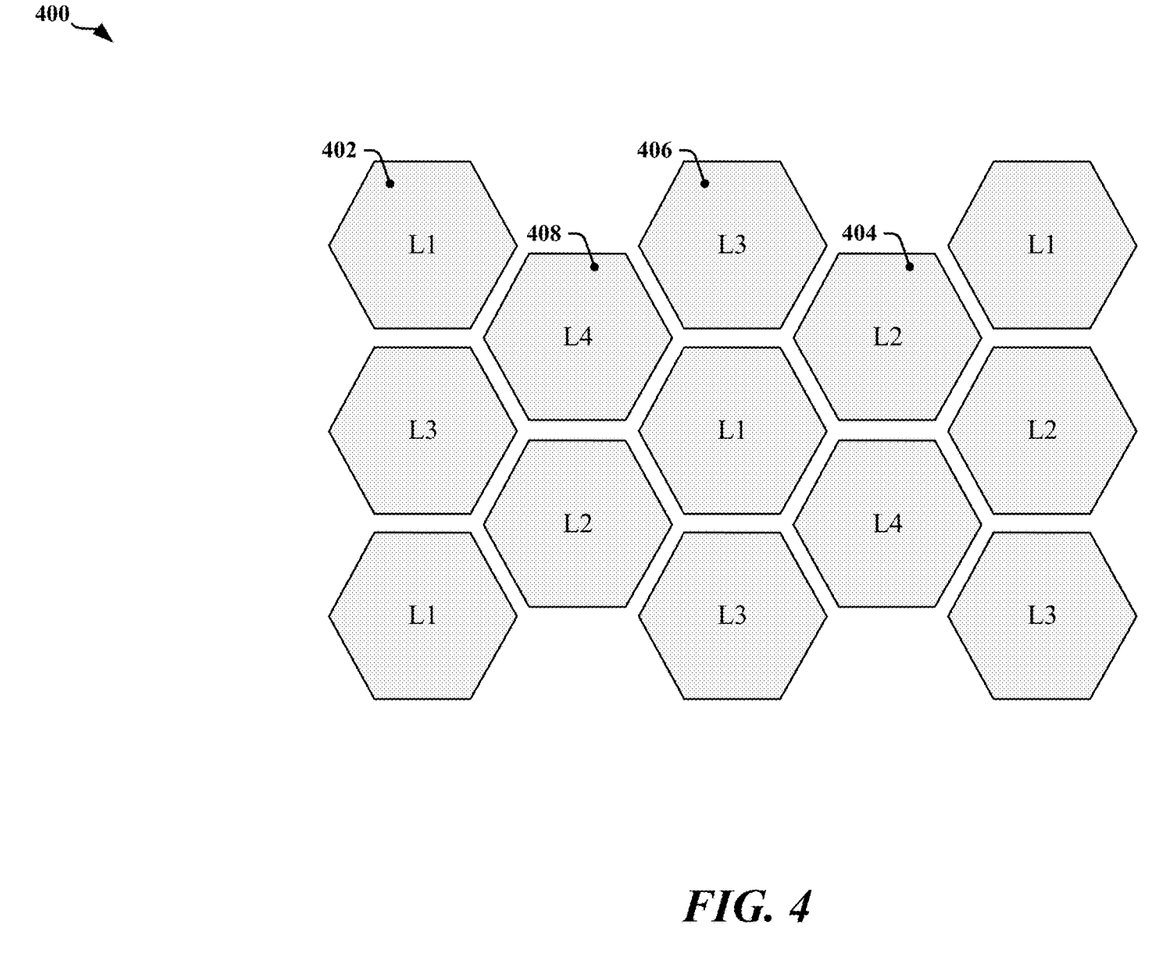
FIG. 4 illustrates the arrangement of power transfer areas provided on a charging surface by a charging device that employs multiple layers of charging cells configured in accordance with certain aspects disclosed herein.

FIG. 4 illustrates the arrangement of power transfer areas provided in a charging surface 400 that employs multiple layers of charging cells configured in accordance with certain aspects disclosed herein. The illustrated charging surface is constructed from four layers of charging cells 402, 404, 406, 408, which may correspond to the layers of charging cells 302, 304, 306, 308 in FIG. 3. In FIG. 4, each power transfer area provided by a charging cell in the first layer of charging cells 402 is marked "L1", each power transfer area provided by a charging cell in the second layer of charging cells 404 is marked "L2", each power transfer area provided by a charging cell in the third layer of charging cells 406 is marked "L3", and each power transfer area provided by a charging cell in the fourth layer of charging cells 408 is marked "L4".

Efficient PCB Manufacture for Wireless Charging Surfaces

Certain aspects of the disclosure relate to the manufacture and configuration of wireless charging devices that provide a charging surface in which multiple charging coils are configured to provide an electromagnetic flux substantially perpendicular to the charging surface. The charging surface may be manufactured using PCBs that have 4 or more layers with coil structures provided on one or more of the layers. In conventional systems, it can be advantageous to have an interconnect that passes through some layers but not all layers of a PCB that has more than 2 layers. For example, blind vias penetrate a surface on only one side of the PCB, while buried vias connect internal layers without penetrating either surface of the PCB. The use of blind and buried vias can allow higher density packing for circuits on a PCB. However, the use of blind and buried vias requires additional process steps in PCB production, often resulting in substantially increased manufacturing cost and time.

According to certain aspects disclosed herein, a charging surface constructed from a PCB with more than 2 layers can be implemented using a stack of two-layer PCBs. In one example, conventional, low-cost 2-layer PCB manufacturing techniques are used to manufacture each two-layer PCB in the stack, which can provide a finished charging surface that has blind and buried vias created using PCB interconnections, through-holes and vias created on or between PCBs in different stack layers. For example, a blind via in a charging surface constructed from four two-layer PCBs may be obtained by providing a via through an interior two-layer PCB. The techniques disclosed herein are applicable to stacks of PCBs that include more than two layers. The techniques disclosed herein are applicable to stacks of PCBs where two or more PCBs have different numbers of layers.

Through-holes, vias and PCB interconnections can be provided without increased time and/or cost associated with PCB manufacture and assembly. In some instances, multiple standard-technology, low-cost PCBs may be joined to form a laminate using an adhesive or other mechanical means to bond a stack of PCBs together to form a single larger multilayer board. PCB interconnections can be made using press-in pins or by soldering individual wires or connectors or a bus connection between the boards.

Figure 5:
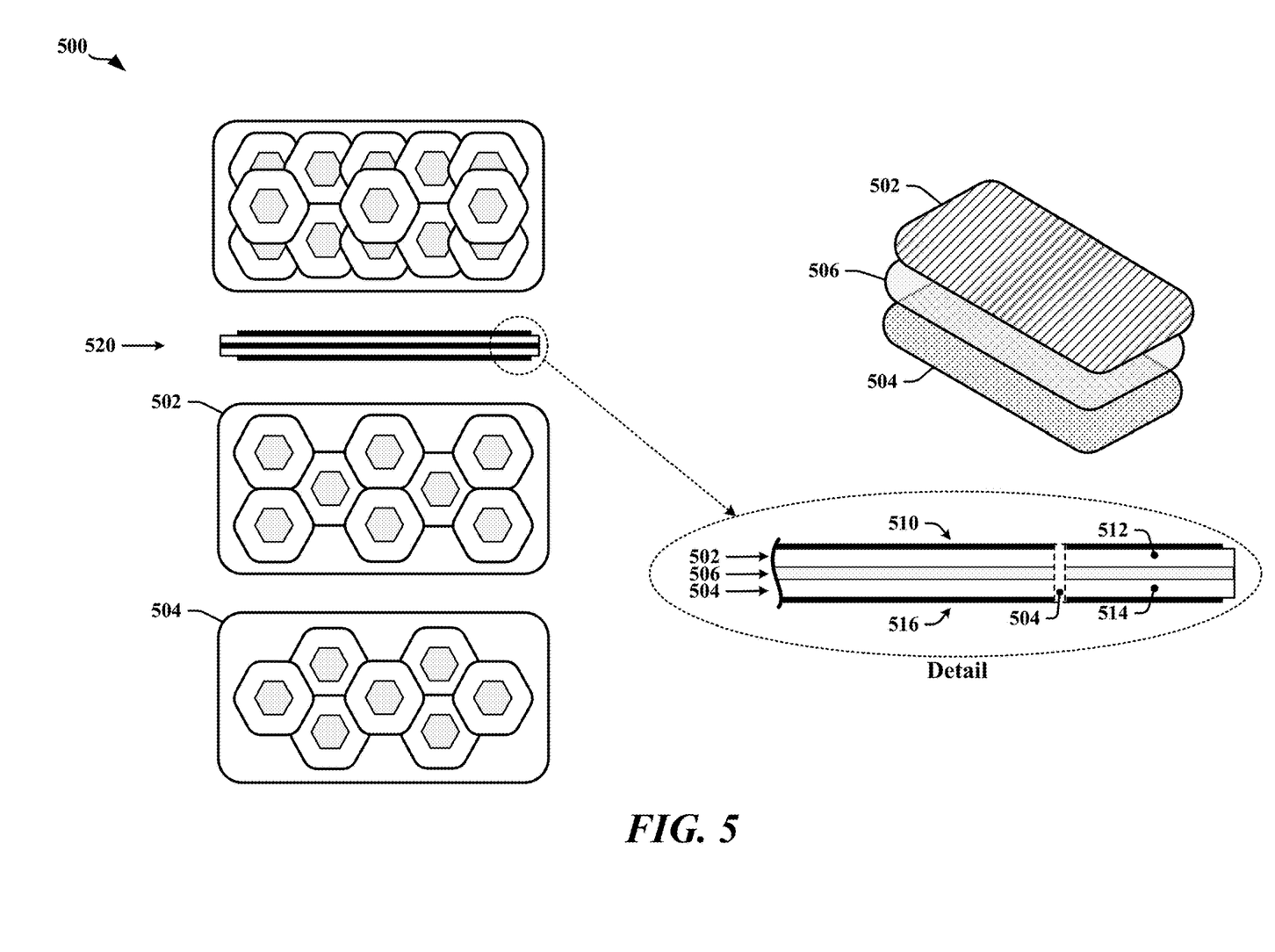
FIG. 5 illustrates a first example of a charging surface of a wireless charging device manufactured, constructed or configured in accordance with certain aspects disclosed herein.

FIG. 5 illustrates a first example of a charging surface 500 in a wireless charging device manufactured, constructed or configured in accordance with certain aspects disclosed herein. The charging surface 500 is shown in profile view at 520. In some examples, the charging surface 500 can be constructed from a limited number of types of PCB. In the illustrated example, the PCBs 502 and 504 are of different types, having different arrangements of charging coils. The different arrangements of charging coils may be configured to provide offset charging cells when assembled. For example, copies of the PCBs 502, 504 may be stacked in a sequence or orientation that produces the power transfer areas of the charging surface 400 in FIG. 4. In some examples, the pattern of charging cells on a PCB may enable overlaps to be configured by stacking multiple units of the PCB with different rotations or with some units flipped with respect to other units. In some instances, a charging surface 500 may be formed using a stack of PCBs that includes a PCB that has a charging cell layout which has a layout that is the mirror image of the layout of another PCB.

In the illustrated charging surface 500, two 2-layer PCBs 502, 504 of the same design are glued or otherwise joined together. In some examples, multiple copies of the same or different PCBs 502, 504 may be stacked or glued to obtain a final laminated charging surface 500. In some examples, more than two PCBs 502, 504 may be layered to form the charging surface 500. The PCBs 502, 504 may have different layers, designs, thicknesses, etc.

In some examples, magnetic or shielding material may be provided within the adhesive layer 506 provided between PCBs 502, 504 to facilitate on-board inductor operation, to shield circuits from EMI and/or for other purposes. In some examples, the magnetic or shielding material may be provided as a separate layer. Magnetic or shielding material cannot easily be inserted between PCBs 502, 504 that form layers of the charging surface 500, where the PCBs 502, 504 are obtained using conventional manufacturing techniques.

In some examples, one or more layers may include thermal conductors, thermal insulators or a combination thereof to manage heat dissipation from the charging surface 500 or heat flow through the charging surface 500. In one example, a layer may include a thermally conductive material that assists dissipation of heat from the charging surface 500. In some examples, the thermally conductive material may be etched or patterned to provide lanes that dissipate heat in a preferred or desired direction. A layer may include a thermal insulator that provides thermal insulation configured to block heat flow between zones of the charging surface 500. In one example, the thermal insulator may be provided as pockets of air. Thermal conductors or thermal insulators may be provided in separate layers.

In some examples, one or more layers may include sensors that can be used to detect presence of objects on or near the charging surface 500, measure temperatures in portions of the charging surface, measure other quantities or properties, or detect other events.

According to certain aspects disclosed herein, a charging surface 500 includes a first PCB 502 having a top layer 510 and a bottom layer 512. The top layer 510 and the bottom layer 512 may be metal or insulated metal. The charging surface 500 includes a second PCB 504 having a top layer 514 and a bottom layer 516. The top layer 514 and the bottom layer 516 may be metal or insulated metal. The charging surface 500 includes an adhesive layer 506 joining the first PCB 502 and the second PCB 504 such that the bottom layer 512 of the first PCB 502 is adjacent to the top layer 514 of the second PCB 504. The charging surface 500 may also include one or more interconnects provided between the bottom layer 512 of the first PCB 502 and the top layer 514 of the second PCB 504.

In one example, at least one interconnect does not penetrate the top layer 510 of the first PCB 502. One or more interconnects may not penetrate the bottom layer 516 of the second PCB 504. The adhesive layer 506 may include openings through which at least one interconnect passes between the first PCB 502 and the second PCB 504.

Figure 6:
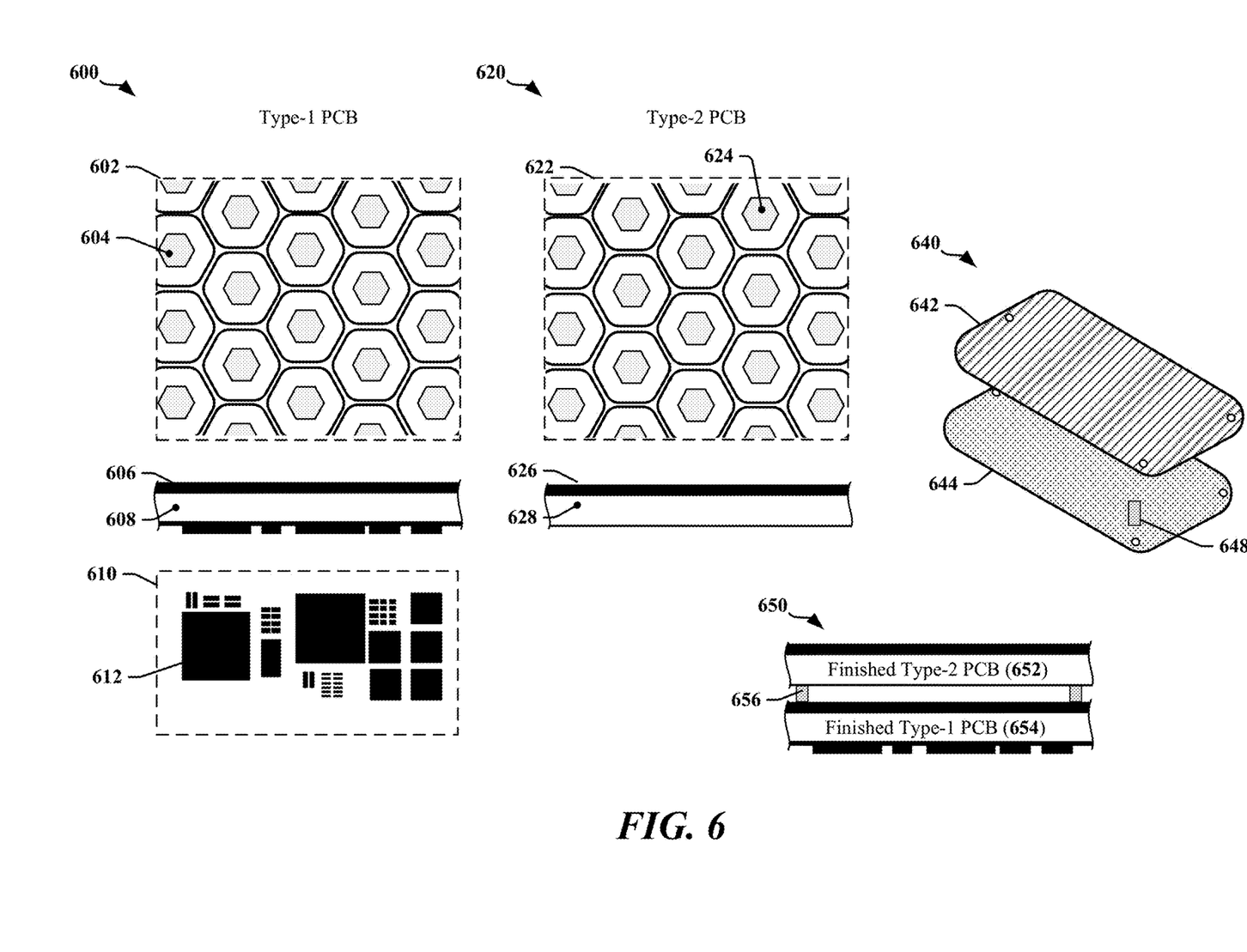
FIG. 6 illustrates a second example of a charging surface of a wireless charging device manufactured, constructed or configured in accordance with certain aspects disclosed herein.

FIG. 6 illustrates a second example of a charging surface in a wireless charging device manufactured, constructed or configured in accordance with certain aspects disclosed herein. The power transferred during charging of multiple chargeable devices and/or during device discovery can result in large current flows to charging coils 604, 624 of the charging surface. In certain implementations, multiple layers of charging coils 604, 624 are needed or desired to provide complete coverage of the charging surface, to maximize the number of center points of charging coils 604, 624 the charging surface and/or to increase electromagnetic flux.

Inner layers of conventional multi-layer PCBs are typically unable to carry the current supplied to charging coils 604, 624 due to restrictions on the thickness of copper usable for the inner layers of the conventional multi-layer PCBs. The limitations on current that can be carried by the inner layers of conventional multi-layer PCBs poses greater challenges for free-positioning charging surfaces provided in accordance with certain aspects of this disclosure, which can charge more than one device concurrently. For example, limitations on current flow through inner layers of conventional multi-layer PCBs would constrain the available multi-device charging configurations of a free-positioning charging surface to configurations that can supplied with sufficient current within the tolerances of the inner layer of a conventional multi-layer PCB. The use of a conventional multi-layer PCB may require the selection of a non-optimal charging configuration for at least one device in order to ensure that each layer is operated within specified current limits. In one example, a controller may be prohibited from selecting a charging configuration that would cause two or more devices to be charged by coils located on the same inner surface when the geometry of the active coils would result a current density in a small section of the inner layer copper that would exceed specified maximum.

Certain aspects disclosed herein provide a charging surface that can be constructed using multiple copies of PCBs 600, 620, which have been finished using simple or conventional manufacturing techniques and which can operate as standalone circuit boards. In a first example, a double-layer PCB 600 has at least one layer that carries charging coils 604 of the charging device. In the illustrated example, charging coils 604 are provided on one surface layer 602 of the double-layer PCB 600, although charging coils 604 may be provided on both surface layers of the double-layer PCB 600. In the illustrated example, the second layer 610 of the double-layer PCB 600 carries control circuits and other devices 612. In one example, the second layer 610 carries one or more sensors. The layers 602 and 610 are surface layers and the thickness of copper 606 on the layers 602 and 610 may be selected to support the current levels expected to be provided to the charging coils 604 during high-power charging events. In one example, a high-power charging event may involve transmission of power in excess of 5 Watts and up to 30 Watts or more. The thickness and composition of the substrate 608 may also be selected to obtain desired electromagnetic performance of the charging coils 604.

In a second example, a single-layer PCB 620 provides charging coils 624 of the charging device on a single copper layer 626. In the illustrated example, charging coils 624 are provided on one surface layer 622 of the double-layer PCB 620, although charging coils 624 may be provided on both surface layers of the double-layer PCB 620. The thickness of the copper layer 626 on the surface layer may be selected to support the current provided to the charging coils 624. The thickness and composition of the substrate 628 may also be selected to obtain desired electromagnetic performance of the charging coils 624.

In some examples, multiple copies of the same or different PCBs 642, 644 may be stacked or laminated to obtain a final PCB assembly 640. Two or more PCBs 642, 644 may be electrically interconnected using connectors 648, through-holes, cables, wires and other devices. In some instances, one or more PCBs 642, 644 can be mirrored, and/or layered as mirrored versions. In some instances, a pair of PCBs 642, 644 may include circuit configurations that are offset with respect to one another after assembly. A PCB 650 assembly may include one or more PCBs 652, 654 that may be mechanically fastened using some combination of screws, nuts, bolts, clips, guides, rails and/or other fasteners. Spacers 656 can be used to provide a desired separation between the PCBs 652, 654. The illustrated PCB 650 assembly includes a 2-layer PCB 652 and a 1-layer PCB 654. In other examples, more than two PCBs 652, 654 may be layered to form the PCB 650 assembly. The PCBs 652, 654 may have different layers, designs, copper thicknesses, etc.

In some examples, magnetic or shielding material may be provided between the PCBs 652, 654 to facilitate on-board inductor operation, to shield circuits from EMI and/or for other purposes. In one example, the double-layer PCB 600 may be configured with charging coils 604 on one layer and ground plane or shield on a second layer.

In some examples, thermal conductors, thermal insulators or a combination thereof can be provided between the PCBs 652, 654 to manage heat dissipation or flow. In one example, a layer may include a thermally conductive material that assists dissipation of heat. In some examples, the thermally conductive material may be etched or patterned to provide lanes that dissipate heat in a preferred or desired direction. A thermal insulator may provide thermal insulation that can operate to block heat flow between the PCBs 652, 654 or between zones of the PCBs 652, 654.

In some examples, the PCBs 652, 654 carry sensors that can be used to detect presence of objects on or near the charging surface 500, measure temperatures in portions of the PCBs 652, 654, measure other quantities or detect other events.

Figure 7:
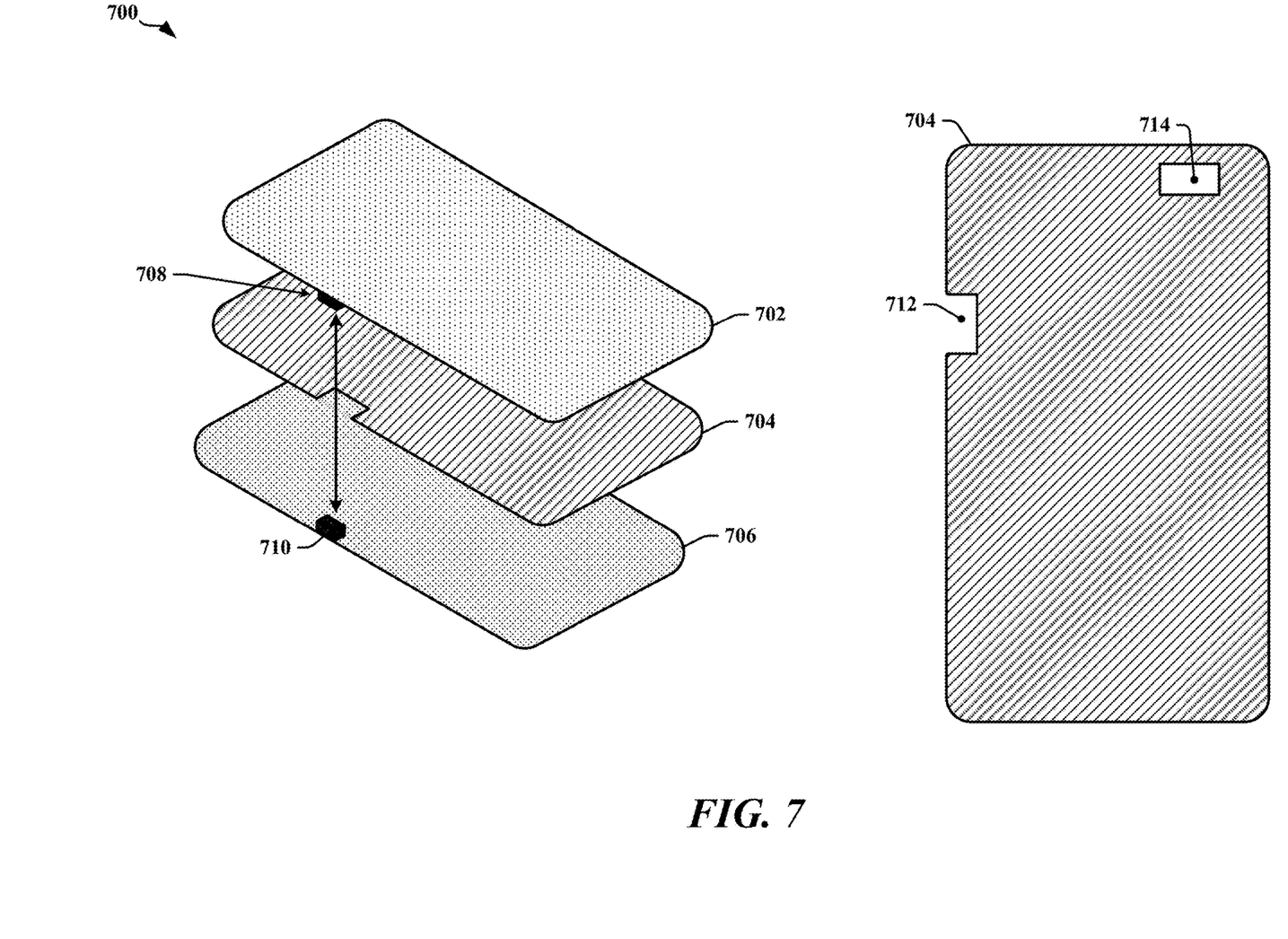
FIG. 7 illustrates a printed circuit board assembly that includes interconnected printed circuit boards in accordance with certain aspects disclosed herein.

FIG. 7 illustrates a PCB assembly 700 that includes three PCBs 702, 704, 706, in which at least two of the PCBs 702, 706 are interconnected independently of the third PCB 704. In one example, the PCBs 702, 704, 706 may be manufactured as two-layer PCBs. In the illustrated example, a first PCB 702 includes a first connector 708 and a second PCB 706 includes a second connector 710 that is configured to mate with the first connector 708. A notch 712 provided in a third PCB 704 provides a clear passage for the mated connectors 708, 710. In some implementations, the electrical connection between the first PCB 702 and the second PCB 706 is accomplished using pins that may be soldered, crimped or otherwise fixed to the first PCB 702 and the second PCB 706.

The third PCB 704 is located between the first PCB 702 and the second PCB 706 in the illustrated PCB assembly 700. The third PCB 704 may include additional notches 712, slots and/or holes 714 to allow passage of connectors between layers of the PCB assembly 700. In some implementations holes notches 712, slots and/or holes 714 in multiple PCBs may be aligned such that connectors can pass through the multiple PCBs.

Figure 8:
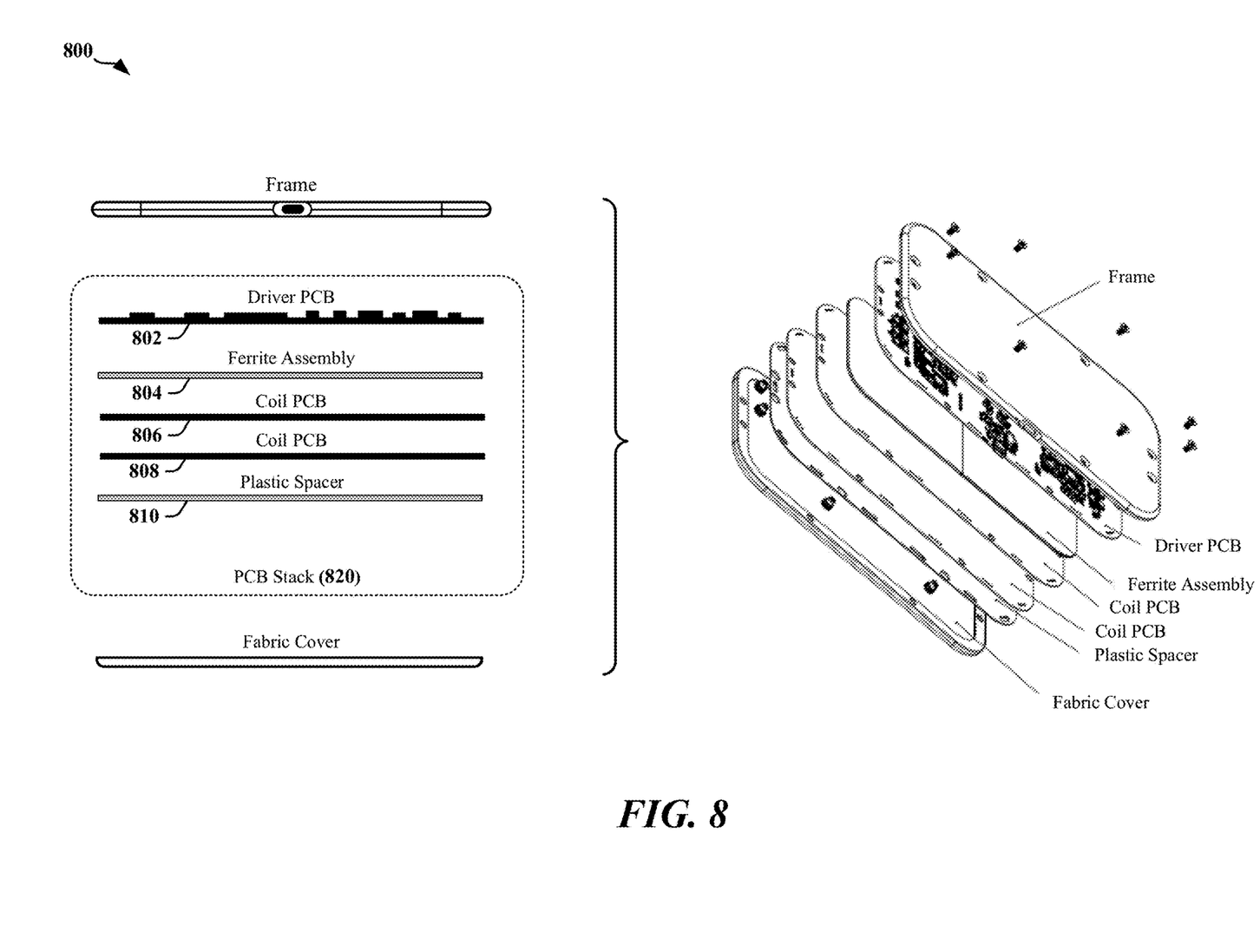
FIG. 8 illustrates an example of a charging device manufactured in accordance with certain aspects disclosed herein.

FIG. 8 illustrates an example of a charging device 800 manufactured in accordance with certain aspects disclosed herein. The charging device 800 is constructed using a PCB stack 820 that includes multiple PCBs 802, 806, 808, a magnetic or shielding layer 804 and a plastic spacer 810 that may serve as a thermal layer. In various examples, the charging device 800 has a first plurality of charging cells provided on a first surface of a first PCB 806, a second plurality of charging cells provided on a first surface of a second PCB 808, and one or more fastenings configured to maintain the first PCB 806 proximate to and in alignment with the second PCB 808. The first PCB 806 and the second PCB 808 may provide a charging surface that has the first plurality of charging cells and the second plurality of charging cells when fastened together.

Each of the first surface and the second surface may be formed using a metal layer configured to carry a current sufficient to wirelessly charge one or more devices through the first plurality of charging cells or the second plurality of charging cells. The first PCB 806 and the second PCB 808 may be fastened together such that the second surface is located between substrates of the first PCB 806 and the second PCB 808. A third plurality of charging cells may be provided on a second surface of the first PCB 806 or on the second PCB 808.

In some examples, a control circuit is provided on a driver PCB 802. In other examples, the control circuit may be provided on the second surface of the first PCB 806 or on the second surface of the second PCB 808.

In some examples, a third plurality of charging cells is provided on a first surface of a third PCB. The charging surface may include the third plurality of charging cells when the first PCB 806, the second PCB 808 and the third PCB are fastened together.

In some examples, the charging device 800 has a third PCB provided between the first PCB 806 and the second PCB 808. An opening may be provided through the third PCB to pass a connector that electrically couples the first PCB 806 and the second PCB 808. The opening may be provided as a notch located at an edge of the third PCB. The opening may be provided as a hole within a perimeter of the third PCB.

In some examples, the charging device 800 includes or operates as charging device 800. The charging device 800 may have a first PCB 806 having a top metal layer and a bottom metal layer, where a first plurality of charging cells is provided on the top metal layer of the first PCB 806 and a second plurality of charging cells is provided on the bottom metal layer of the first PCB 806. The charging device 800 may have a second PCB 808 having a top metal layer and a bottom metal layer, where a third plurality of charging cells is provided on the top metal layer of the second PCB 808 and a fourth plurality of charging cells is provided on the bottom metal layer of the second PCB 808. An adhesive layer may join the first PCB 806 and the second PCB 808 such that the bottom metal layer of the first PCB 806 is adjacent to the top metal layer of the second PCB 808. One or more interconnects may be provided between the bottom metal layer of the first PCB 806 and the top metal layer of the second PCB 808. In some instances, each charging cell in the first plurality of charging cells, the second plurality of charging cells, the third plurality of charging cells and the fourth plurality of charging cells may be energized independently of the other charging cells provided in the charging device 800.

In one example, at least one of the first PCB 806 and the second PCB 808 has one or more internal metal layers provided between the top metal layer and the bottom metal layer. Additional charging cells may be provided on the one or more internal metal layers.

In one example, the charging device 800 has a shielding layer 804 that includes a magnetic or electromagnetic shielding material. The shielding layer 804 may be provided between the driver PCB 802 and the first PCB 806. The shielding layer 804 may be provided between the first PCB 806 and the second PCB 808. In one example, the charging device 800 has a thermal layer that includes a thermal conductor configured to dissipate a heat flow from the first PCB 806 or the second PCB 808. The thermal layer may be provided between the first PCB 806 and the second PCB 808. In one example, the charging device 800 has a thermal layer that includes a thermal insulator configured to block heat flow between zones of the first PCB 806 or the second PCB 808, between the first PCB 806 and the second PCB 808 or between the first PCB 806 or the second PCB 808 and an exterior of the charging device 800. The blocking thermal layer may be provided between the first PCB 806 and the second PCB 808. In one example, the charging device 800 has a sensor provided on the first PCB 806 or the second PCB 808 and configured to detect presence of an object on or near the charging device 800. In one example, the charging device 800 has a sensor configured to detect temperature in the first PCB 806 or the second PCB 808.

In certain examples, the first PCB 806 and the second PCB 808 present a charging surface to a device to be charged. Each charging cell in the first plurality of charging cells, the second plurality of charging cells, the third plurality of charging cells and the fourth plurality of charging cells may have a coil that surrounds a portion of power transfer area associated with the charging surface. The charging surface may correspond to the top metal layer of the first PCB 806. A set of switches may be operable to selectively couple at least one charging cell in the charging device 800 to a power source. A controller may be configured to select the at least one charging cell based on an orientation or location of the device to be charged with respect to the charging surface. A detection circuit may be coupled to charging cells on at least one layer of at least one PCB, the detection circuit being configured to cooperate with one or more sensors to detect an object proximate to the charging device 800 or with circuits configured to detect differences in capacitance associated with two or more charging cells that may indicate presence of an object proximate to the charging device 800.

In one example, at least one interconnect does not penetrate the top metal layer of the first PCB 806. In one example, at least one interconnect does not penetrate the bottom metal layer of the second PCB 808. In one example, the adhesive layer includes openings through which at least one interconnect passes between the first PCB 806 and the second PCB 808. In one example, each of the first PCB 806 and the second PCB 808 has a flexible PCB. In one example, each of the first PCB 806 and the second PCB 808 has a non-planar PCB.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A wireless charging device, comprising:
   a first printed circuit board having a first surface with a first plurality of charging cells formed thereon;
   a second printed circuit board having a first surface with a second plurality of charging cells formed thereon;
   a third printed circuit board having an opening formed therein;
   one or more fastenings configured to align and fasten the first printed circuit board to and the second printed circuit board when the third printed circuit board is located between the first printed circuit board and the second printed circuit board; and
   a connector configured to electrically couple the first printed circuit board to the second printed circuit board when the first printed circuit board and the second printed circuit board are fastened and aligned,
   wherein the connector is further configured to pass through the opening in the third printed circuit board, and
   wherein a charging surface of the wireless charging device is provided using the first plurality of charging cells and the second plurality of charging cells when the first printed circuit board and the second printed circuit board are fastened and aligned.

2. The wireless charging device of claim 1, wherein each first surface comprises a metal layer configured to carry a current sufficient to wirelessly charge one or more devices through the first plurality of charging cells or the second plurality of charging cells.

3. The wireless charging device of claim 2, wherein the first printed circuit board and the second printed circuit board are fastened together such that the first surface of the second printed circuit board is located between substrates of the first printed circuit board and the second printed circuit board.

4. The wireless charging device of claim 2, wherein a third plurality of charging cells is formed on a second surface of the first printed circuit board or the second printed circuit board.

5. The wireless charging device of claim 1, wherein a control circuit is provided on a second surface of the first printed circuit board or on a second surface of the second printed circuit board.

6. The wireless charging device of claim 1, wherein the third printed circuit board has a first surface with a third plurality of charging cells formed thereon, wherein the charging surface of the wireless charging device is provided using the first plurality of charging cells and the second plurality of charging cells and the second printed circuit board and the third plurality of charging cells.

7. The wireless charging device of claim 1, wherein the opening comprises a notch located at an edge of the third printed circuit board.

8. The wireless charging device of claim 1, wherein the opening comprises a hole within a perimeter of the third printed circuit board.

9. The wireless charging device of claim 1, further comprising:
   a shielding layer that includes a magnetic or electromagnetic shielding material.

10. The wireless charging device of claim 9, wherein the shielding layer is provided between the first printed circuit board and the second printed circuit board.

11. The wireless charging device of claim 1, further comprising:
    a thermal layer that includes a thermal conductor configured to dissipate a heat flow from the first printed circuit board or the second printed circuit board.

12. The wireless charging device of claim 11, wherein the thermal layer is provided between the first printed circuit board and the second printed circuit board.

13. The wireless charging device of claim 1, further comprising:
   a thermal layer that includes a thermal insulator configured to block heat flow between zones of the first printed circuit board or the second printed circuit board or between the first printed circuit board and the second printed circuit board.

14. The wireless charging device of claim 13, wherein the thermal layer is provided between the first printed circuit board and the second printed circuit board.

15. The wireless charging device of claim 1, further comprising:
   a sensor provided on the first printed circuit board or the second printed circuit board and configured to detect presence of an object on or near the wireless charging device.

16. The wireless charging device of claim 1, further comprising:
   a sensor configured to detect temperature in the first printed circuit board or the second printed circuit board.

* * * * *